United States Patent
Hsu

(10) Patent No.: US 9,013,897 B2
(45) Date of Patent: Apr. 21, 2015

(54) POWER SUPPLY

(75) Inventor: Min-Hua Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 370 days.

(21) Appl. No.: 13/478,405

(22) Filed: May 23, 2012

(65) Prior Publication Data

US 2012/0299566 A1    Nov. 29, 2012

Related U.S. Application Data

(60) Provisional application No. 61/489,578, filed on May 24, 2011.

(51) Int. Cl.
H02M 3/335 (2006.01)
(52) U.S. Cl.
CPC .................. H02M 3/33523 (2013.01)
(58) Field of Classification Search
CPC ........................ H02M 3/335; H02M 3/33523
USPC ............ 363/21.01, 21.07, 21.09, 21.1, 21.15, 363/21.17, 21.18
See application file for complete search history.

(56) References Cited

U.S. PATENT DOCUMENTS

| | | | |
|---|---|---|---|
| 6,286,609 B1 | 9/2001 | Carrier et al. | |
| 6,344,980 B1 | 2/2002 | Hwang et al. | |
| 6,693,810 B2 * | 2/2004 | Robinson et al. | 363/97 |
| 6,865,094 B2 | 3/2005 | Malik et al. | |
| 6,909,616 B2 * | 6/2005 | Kim | 363/16 |
| 7,598,680 B2 * | 10/2009 | Chen et al. | 315/291 |
| 7,876,067 B2 * | 1/2011 | Greenfeld et al. | 320/108 |
| 8,358,517 B2 * | 1/2013 | Chiang | 363/21.12 |
| 2006/0181241 A1 | 8/2006 | Veselic | |
| 2007/0001646 A1 | 1/2007 | Kojima | |
| 2008/0068871 A1 | 3/2008 | Kokubun et al. | |
| 2013/0170621 A1 * | 7/2013 | Saka et al. | 378/104 |

FOREIGN PATENT DOCUMENTS

| | | |
|---|---|---|
| CN | 101145699 | 3/2008 |
| CN | 101826795 A | 9/2010 |
| TW | 513837 | 12/2007 |
| TW | I330444 | 9/2010 |
| TW | I342096 | 5/2011 |

* cited by examiner

*Primary Examiner* — Matthew Nguyen
(74) *Attorney, Agent, or Firm* — Muncy, Geissler, Olds & Lowe, P.C.

(57) ABSTRACT

A power supply applied to an electronic device for providing power includes a transformer unit, a connector, a pulse-width modulation (PWM) control unit, and a switch unit. The connector is electrically connected with the secondary side of the transformer unit for outputting a first output voltage. The PWM control unit outputs a pulse signal with a first period. The switch unit is electrically connected between the PWM control unit and the primary side of the transformer unit. When the electronic device is connected to the power supply, the connector receives an external control signal, and the PWM control unit adjusts the pulse width of the pulse signal to a second period and transmits the pulse signal with the second period to the switch unit to control the connector to output a second output voltage to the electronic device.

9 Claims, 2 Drawing Sheets

POWER SUPPLY

CROSS REFERENCE TO RELATED APPLICATIONS

The non-provisional patent application claims priority to U.S. provisional patent application with Ser. No. 61/489,578 filed on May 24, 2011. This and all other extrinsic materials discussed herein are incorporated by reference in their entirety.

BACKGROUND OF THE INVENTION

1. Field of Invention

The disclosure relates to a power transformer and, in particular, to a power supply.

2. Related Art

As the popular of portable electronic devices, the applications of the adaptors or chargers with USB connectors are increasing. Regarding to the current specifications, the standard output spec of USB2.0 is 5V/0.5 A, and the standard output spec of USB3.0 is 5V/0.9 A. The output spec of the cell phone charger using USB2.0 is generally 5V/1 A, or up to 5V/2 A. Accordingly, the maximum output power of a single USB connector is about 10 W.

Besides, when the adaptor or charger uses the USB port and outputs the power voltage, it cannot provide higher power voltage/current (less than 5V, 2 A) to the external electronic device due to the limitation of the available current or voltage output (must follow the USB specifications). Thus, the application of the adaptor or charger is restricted.

SUMMARY OF THE INVENTION

This disclosure provides a power supply applied to an electronic device for providing power. The power supply includes a transformer unit, a connector, a pulse-width modulation (PWM) control unit, and a switch unit. The connector is electrically connected with the secondary side of the transformer unit for outputting a first output voltage. The PWM control unit outputs a pulse signal with a first period. The switch unit is electrically connected between the PWM control unit and the primary side of the transformer unit. When the electronic device is connected to the power supply, the connector receives an external control signal from the electronic device, and the PWM control unit adjusts pulse width of the power signal with a second period and transmits the pulse signal with the second period to the switch unit to control the connector to output a second output voltage to the electronic device.

As mentioned above, the power supply of this disclosure receives an external control signal through the connector (e.g. a USB connector) and changes the outputted voltage value according to the external control signal. Thus, the power supply of the disclosure can be applied to general electronic device and other electronic device with larger power consumption. When a general electronic device is connected with the power supply through the connector, the electronic device does not transmit the external control signal to the power supply, so that the power supply outputs the normal voltage value (e.g. 5V). Otherwise, when an electronic device with larger power consumption is connected with the power supply through the connector, the electronic device transmits the external control signal to the power supply, so that the power supply outputs a higher voltage value (e.g. 15V). This configuration can increase the output power under the circumstance of the same current.

These and other features, aspects and advantages of the present invention will become better understood with regard to the following description, appended claims, and accompanying drawings.

DETAILED DESCRIPTION OF THE INVENTION

Figure 1:
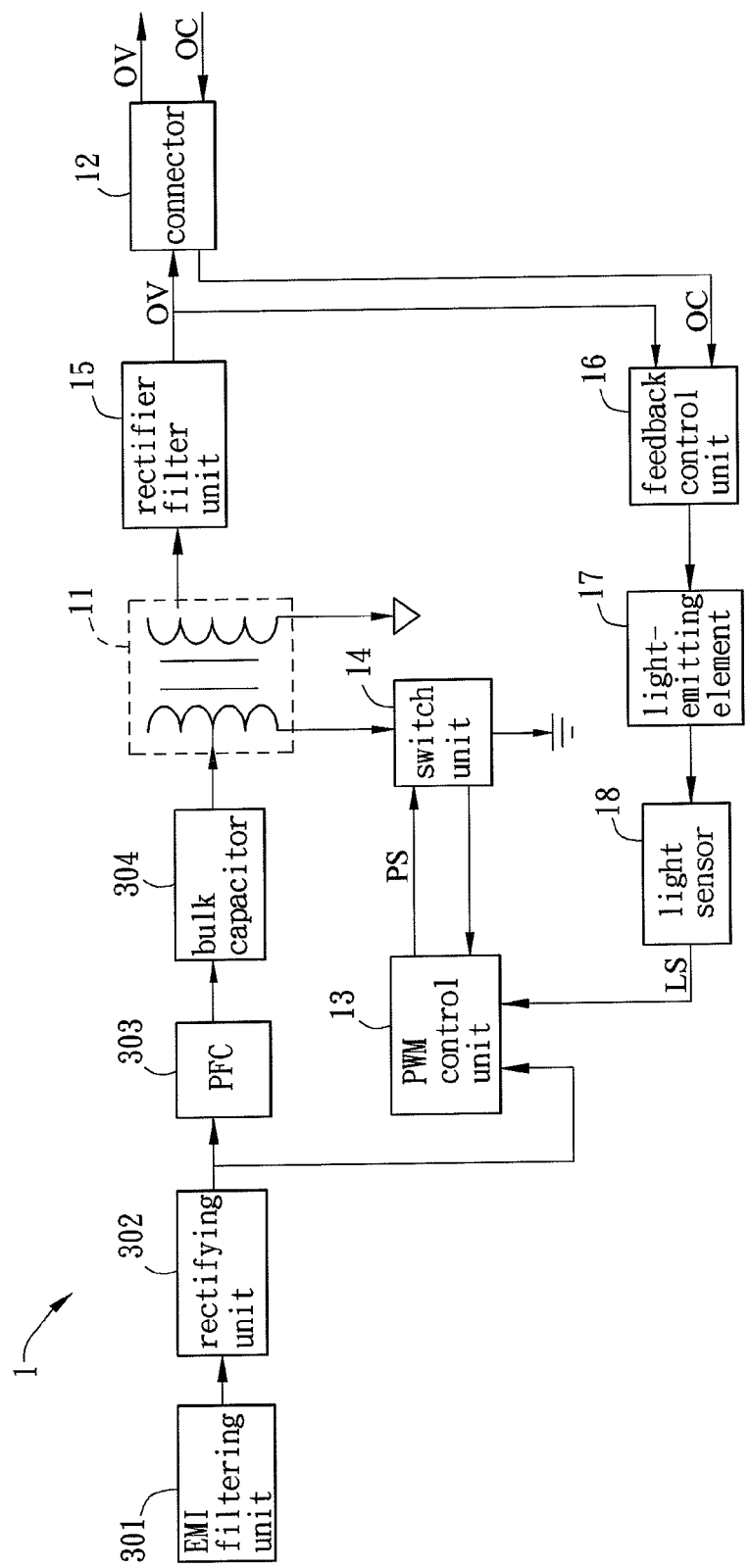
FIG. 1 is a block diagram of a power supply according to an embodiment of the disclosure.

FIG. 1 is a block diagram of a power supply 1 according to an embodiment of the disclosure. In this embodiment, the power supply 1 includes a transformer unit 11, a connector 12, a pulse-width modulation (PWM) control unit 13, and a switch unit 14.

The transformer unit 11 has a primary side and a secondary side. The connector 12 is electrically connected with the secondary side of the transformer unit 11. The connector 12 of this embodiment is, not limited to, a cabled connector or a wireless connector. Herein, the connector 12 is for example a USB connector. The power supply 1 is electrically connected to an electronic device through the connector 12 for providing power to the electronic device to charge it. The electronic device is, for example but not limited to, a tablet computer, a cell phone, or a laptop computer.

In general, the USB connector commonly provides an output power consumption is 2.5 W (5V/0.5 A), and if necessary, its output power consumption can be increased to 10 W (5V/2 A). Regarding to the power supply 1 of this disclosure, if the electronic device requires higher power consumption, such as higher than 10 W, the power supply of this disclosure can also provide the desired higher output power consumption. As the following embodiment, when the electronic device is connected to the connector 12 of the power supply 1 through a transmission cable, the electronic device can also transmit an external control signal OC to the power supply 1. Then, the external control signal OC enters the power supply 1 through connector 12 of the power supply 1. Accordingly, the power supply 1 of this disclosure changes the output power voltage (e.g. increasing the output power voltage) according to the external control signal OC so as to achieve the power consumption requirement of the electronic device.

The external control signal OC can be a DC signal or an AC signal. In this embodiment, the external control signal OC is a DC signal for example, and it is transmitted through a ground pin of the connector 12.

In this embodiment, the power supply 1 further includes a rectifier filter unit 15, which is electrically connected with the secondary side of the transformer unit 11 and the connector 12. Thus, the rectifier filter unit 15 can rectify and filter the output voltage from the secondary side. Since the rectifier filter unit 15 can be any usable conventional rectifier filter unit, the detailed description thereof will be omitted.

In this embodiment, the power supply 1 further includes a feedback control unit 16, which is electrically connected with the connector 12 for receiving the external control signal OC. In addition, the feedback control unit 16 further electrically connected with the power supply 1, and provides the output voltage to the electronic device. Herein, the feedback control unit 16 is electrically connected with the rectifier filter unit 15 for receiving the output voltage. By feeding the output voltage back to the feedback control unit 16, it is possible to ensure the output voltage to reach a predetermined value (e.g. using a USB connector to output a 15V DC voltage). In this case, the predetermined value represents a second output voltage.

In this embodiment, the power supply 1 further includes a light-emitting element 17 and a light sensor 18. For instance, the light-emitting element 17 can be a light-emitting diode (LED), and the light sensor 18 can be a light sensor. The light-emitting element 17 is electrically connected with the feedback control unit 16, and it is controlled to turn on/off according to the external control signal. The light sensor 18 is electrically connected with the PWM control unit 13. In practice, the light sensor 18 can sense the light emitted from the light-emitting element 17 and then generate a light sensing signal LS (e.g. a voltage signal) to the PWM control unit 13.

Figure 2:
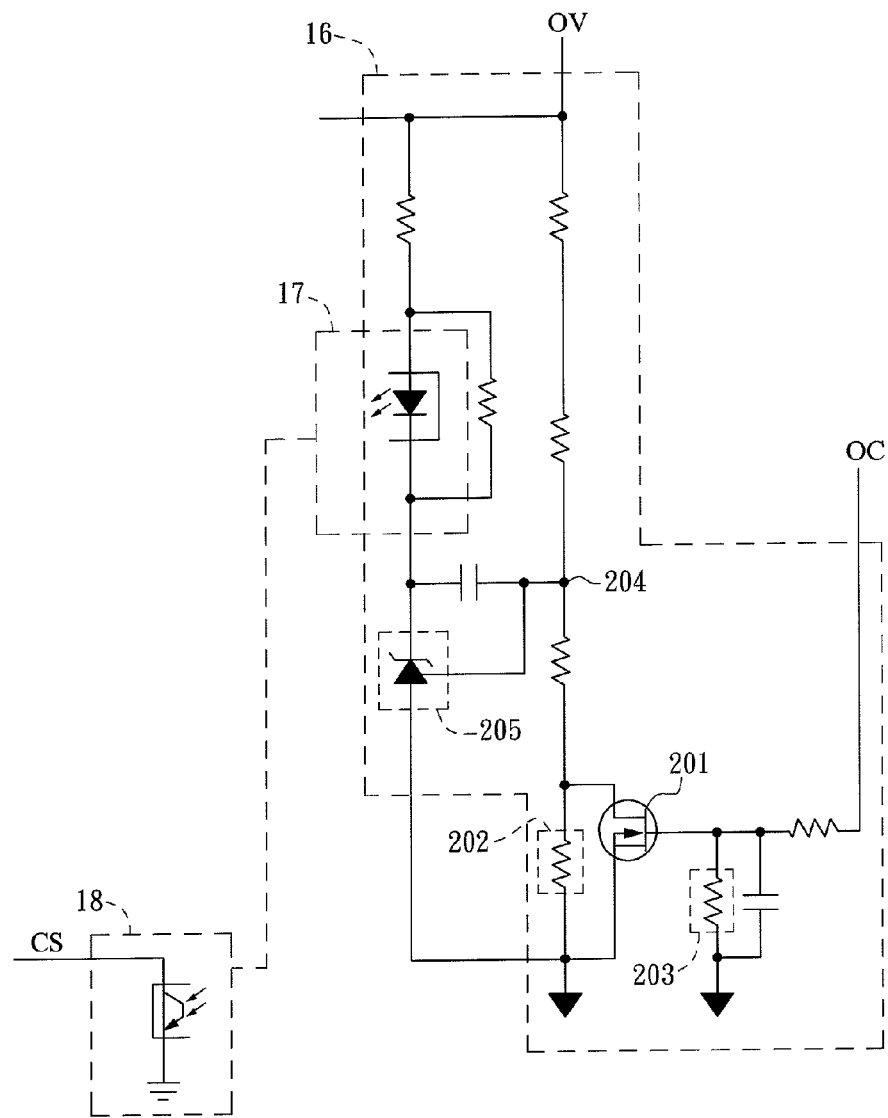
FIG. 2 is a schematic diagram showing the circuits of a feedback control unit and a light-emitting element of an aspect according to the embodiment of the disclosure.

FIG. 2 is a schematic diagram showing the circuits of the feedback control unit 16 and the light-emitting element 17 of an aspect according to the embodiment of the disclosure. To be noted, this example is not to limit the invention, and those skilled in the art should know that there are many equivalent circuits or other circuits capable of achieving the same function. Referring to FIG. 2, the external control signal OC can turn on a transistor 201 of the feedback control unit 16 so as to connect the resistors 202 and 203 in parallel. This operation can decrease the voltage of the node 204. At this moment, a large current flows through a voltage regulator 205 for maintaining the voltage of the node 204. This large current can drive the light-emitting element 17 to emit light. The light sensor 18 senses the light emitted from the light-emitting element 17 and generates a light sensing signal LS to the PWM control unit 13.

Referring to FIG. 1 again, the PWM control unit 13 is electrically connected with the primary side of the transformer unit 11. Herein, the PWM control unit 13 is connected with the primary side of the transformer unit 11 through a switch unit 14. In other words, the switch unit 14 is configured between the PWM control unit 13 and the primary side of the transformer unit 11. When the electronic device needing large power consumption from the power supply 1, the electronic device transmits an external control signal to the power supply 1 to control the light-emitting unit 17 to emit light, and the light sensor 18 senses the light emitted from the light-emitting element 17 and generates a light sensing signal to the PWM control unit 13. Then, the PWM control unit 13 adjusts the pulse width of the pulse signal from a first period to a second period, and transmits the pulse signal with the second period to the switch unit 14 to enable the transformer unit 11, thereby controlling the connector 12 to output a second output voltage to the electronic device.

When the connector 12 does not receive the external control signal (e.g. when an electronic device, which does not need higher power), the PWM control unit 13 transmits the pulse width of the pulse signal with the first period to the electronic device to enable the transformer unit 11, thereby controlling the connector 12 to output a first output voltage to the electronic device. In this case, the first output voltage is 5V, and the second output voltage is 15V. For example, the duty cycle (first period) corresponding to the first output voltage is 15% to 20%, and the duty cycle (second period) corresponding to the second output voltage is 45% to 60%.

In addition, the power supply 1 of the embodiment receives an AC power source such as the 110V. In order to apply the power supply 1 to the adaptor, the power supply 1 may further include an electromagnetic interference (EMI) filtering unit 301 and a rectifying unit 302. The EMI filtering unit 301 receives the AC power source and filters out the EMI noise. The rectifying unit 302 is configured to rectify the AC power source. In addition, the power supply 1 may include a power factor corrector (PFC) 303 and a bulk capacitor 304. The PFC 303 is electrically connected with the rectifying unit 302 and the PWM control unit 13, and further electrically connected to the primary side of the transformer unit 11 through the bulk capacitor 304. Since the EMI filtering unit 301, rectifying unit 302, PFC 303 and bulk capacitor 304 can be any usable conventional similar components, the detailed description thereof will be omitted.

In summary, the power supply of this disclosure can be applied to general electronic device and other electronic device with larger power consumption. When an electronic device with larger power consumption is connected with the power supply through a transmission cable, the electronic device transmits an external control signal to the power supply so as to change the output power voltage from the power supply, thereby the power supply outputting a higher power voltage to the electronic device.

If the electronic device does not transmit the external control signal to the power supply, the power supply can continuously output the normal output power voltage.

In this disclosure, the connector of the power supply is a USB connector. Thus, when the electronic device is connected with the power supply by connecting the USB cable to the USB connector of the power supply, and the electronic device requires larger power consumption, the electronic device can transmit an external control signal to the power supply to control the power supply to provide a higher voltage (e.g. 15V, which exceeds the output power voltage of the USB specification). Accordingly, it is possible to increase the output power consumption under the circumstance of the same current.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power supply applied to an electronic device, comprising:
   a transformer unit;
   a connector electrically connected with a secondary side of the transformer unit for outputting a first output voltage;
   a pulse-width modulation (PWM) control unit outputting a pulse signal with a first period; and
   a switch unit electrically connected between the PWM control unit and a primary side of the transformer unit;
   a feedback control unit connected to the connector includes:
      a transistor;
      a first resistor connected in parallel to the transistor;
      a second resistor connected to the first resistor; and
      a voltage regulator connected to the second resistor;
   a light-emitting element connected with the voltage regulator; and
   a light sensor electrically connected with the PWM control unit for sensing the light emitted from the light-emitting element;
   wherein, when the electronic device is connected to the power supply, the connector receives an external control signal, and the PWM control unit adjusts the pulse width of the pulse signal to a second period and transmits the pulse signal with the second period to the switch unit to control the connector to output a second output voltage to the electronic device.

2. The power supply of claim 1, wherein the power supply receives the external control signal from the electronic device.

3. The power supply of claim 1, wherein the power supply is an adaptor or a charger.

4. The power supply of claim 1, wherein the connector is a cable connector or a wireless connector.

5. The power supply of claim 1, wherein the connector is an USB connector.

6. The power supply of claim 1, wherein the external control signal is a DC signal or an AC signal.

7. The power supply of claim 1, wherein the external control signal is transmitted through a ground pin of the connector.

8. The power supply of claim 1, wherein the power supply receives an AC power source.

9. The power supply of claim 8, further comprising:
   an electromagnetic interference (EMI) filtering unit receiving the AC power source; and
   a rectifying unit electrically connected with the EMI filtering unit.

\* \* \* \* \*